United States Patent
Tschurtz

(10) Patent No.: US 8,141,585 B2
(45) Date of Patent: Mar. 27, 2012

(54) ROCKER TYPE DIAPHRAGM VALVE

(75) Inventor: Andreas Tschurtz, Aalen (DE)

(73) Assignee: Norgren GmbH, Alpen (DE)

( * ) Notice: Subject to any disclaimer, the term of this patent is extended or adjusted under 35 U.S.C. 154(b) by 849 days.

(21) Appl. No.: 12/281,174

(22) PCT Filed: Mar. 15, 2006

(86) PCT No.: PCT/EP2006/002376
§ 371 (c)(1),
(2), (4) Date: Aug. 29, 2008

(87) PCT Pub. No.: WO2007/104332
PCT Pub. Date: Sep. 20, 2007

(65) Prior Publication Data
US 2009/0308460 A1    Dec. 17, 2009

(51) Int. Cl.
*F16K 31/00* (2006.01)
*F16K 11/048* (2006.01)
(52) U.S. Cl. .................. 137/625.27; 137/627.5; 251/331
(58) Field of Classification Search ............ 137/625.27, 137/625.5, 625.66, 627.5; 251/331
See application file for complete search history.

(56) References Cited

U.S. PATENT DOCUMENTS

| | | | |
|---|---|---|---|
| 3,415,284 A * | 12/1968 | Stampfli | 137/625.66 |
| 4,029,295 A | 6/1977 | Wassmer | |
| 4,161,190 A * | 7/1979 | Moller et al. | 137/596.18 |
| 4,237,931 A * | 12/1980 | Rafaely | 137/625.5 |
| 4,662,399 A | 5/1987 | Buchner et al. | |
| 5,199,462 A * | 4/1993 | Baker | 137/625.44 |
| 5,924,441 A * | 7/1999 | Leys et al. | 137/312 |
| 5,971,024 A * | 10/1999 | Penny | 137/859 |
| 5,971,025 A | 10/1999 | Backlund | |
| 6,186,175 B1 * | 2/2001 | Frisch et al. | 137/625.66 |
| 6,220,299 B1 | 4/2001 | Arvidsson et al. | |
| 6,679,162 B2 * | 1/2004 | Hellemann | 91/447 |
| 7,571,892 B2 * | 8/2009 | Newberg | 251/331 |
| 2003/0075701 A1 * | 4/2003 | Barzuza et al. | 251/331 |
| 2005/1150560 | 7/2005 | Amato | |

FOREIGN PATENT DOCUMENTS

| | | |
|---|---|---|
| EP | 0933569 A2 | 8/1999 |
| FR | 2373737 A1 | 7/1978 |
| GB | 698849 A | 10/1953 |
| GB | 2023258 A | 12/1979 |
| JP | 09042521 | 2/1997 |
| JP | 09317907 | 12/1997 |

* cited by examiner

*Primary Examiner* — John Rivell
*Assistant Examiner* — R. K. Arundale
(74) *Attorney, Agent, or Firm* — The Ollila Law Group LLC

(57) ABSTRACT

A rocker type diaphragm valve is disclosed. The diaphragm (428) in the diaphragm valve is asymmetric and the stroke of the diaphragm is offset from the center of the diaphragm. The two sealing surfaces (318, 320) that the diaphragm acts against form two planes that make an angle with respect to ones another. The diaphragm (428) may be fabricated in only one piece. The diaphragm (428) may also be made from a resilient material and shaped in such a way as to create a spring force holding the diaphragm into a default position in the valve.

19 Claims, 4 Drawing Sheets

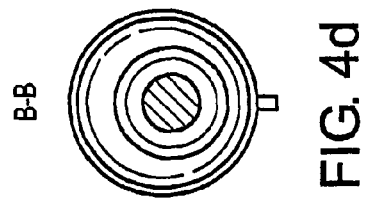
FIG. 4d
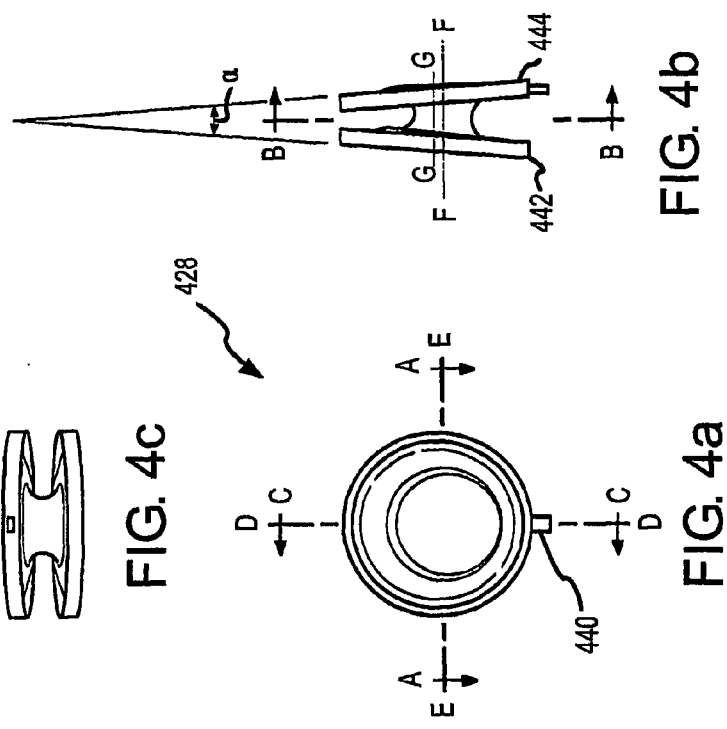
FIG. 4b
FIG. 4c
FIG. 4a
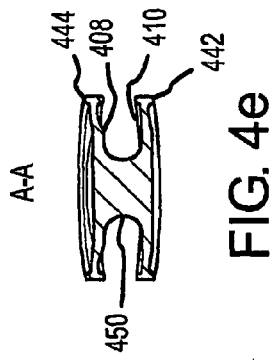
FIG. 4e
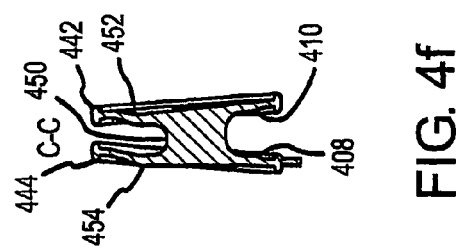
FIG. 4f

ROCKER TYPE DIAPHRAGM VALVE

RELATED APPLICATIONS

This application is related to applications "A one piece double membrane diaphragm" and "A springy diaphragm in a diaphragm valve" filed on the same day as this application and hereby included by reference into this application.

BACKGROUND OF THE INVENTION

1. Field of the Invention

The invention is related to the field of valves, and in particular, to an improved diaphragm valve.

2. Description of the Prior Art

Poppet valves can be stacked together to form control systems. The width of the poppet valve is typically known as the slice width. Reducing the slice width allows more valves to be placed in the same amount of space. Unfortunately the flow rate through a valve is typically determined by the slice width. Reducing the slice width typically reduces the flow rate through the valve. This leads to a trade-off between the valve width and the flow rate through the valve.

Therefore there is a need for a poppet valve having a reduced slice width with an improved flow rate.

SUMMARY OF THE INVENTION

A rocker type diaphragm valve is disclosed. The diaphragm is asymmetric along a first axis and symmetric along a second axis where the first and second axis are generally perpendicular to the stroke of the diaphragm. The two sealing surfaces that the diaphragm acts against form two planes that make an angle with respect to one another. The diaphragm may be fabricated in only one piece. The diaphragm may also be made from a resilient material and shaped in such a way as to create a spring force holding the diaphragm into a default position in the valve.

BRIEF DESCRIPTION OF THE DRAWINGS

FIG. 4a is a top view of diaphragm 428 in an example embodiment of the invention.

FIG. 4b is a side view of diaphragm 428 in an example embodiment of the invention.

FIG. 4c is a back view of diaphragm 428 in an example embodiment of the invention.

FIG. 4d is a sectional view looking down on diaphragm 428 in an example embodiment of the invention.

FIG. 4e is a sectional view AA of diaphragm 428 in an example embodiment of the invention.

FIG. 4f is a sectional view CC of diaphragm 428 in an example embodiment of the invention.

DETAILED DESCRIPTION OF THE PREFERRED EMBODIMENT

Figure 3:
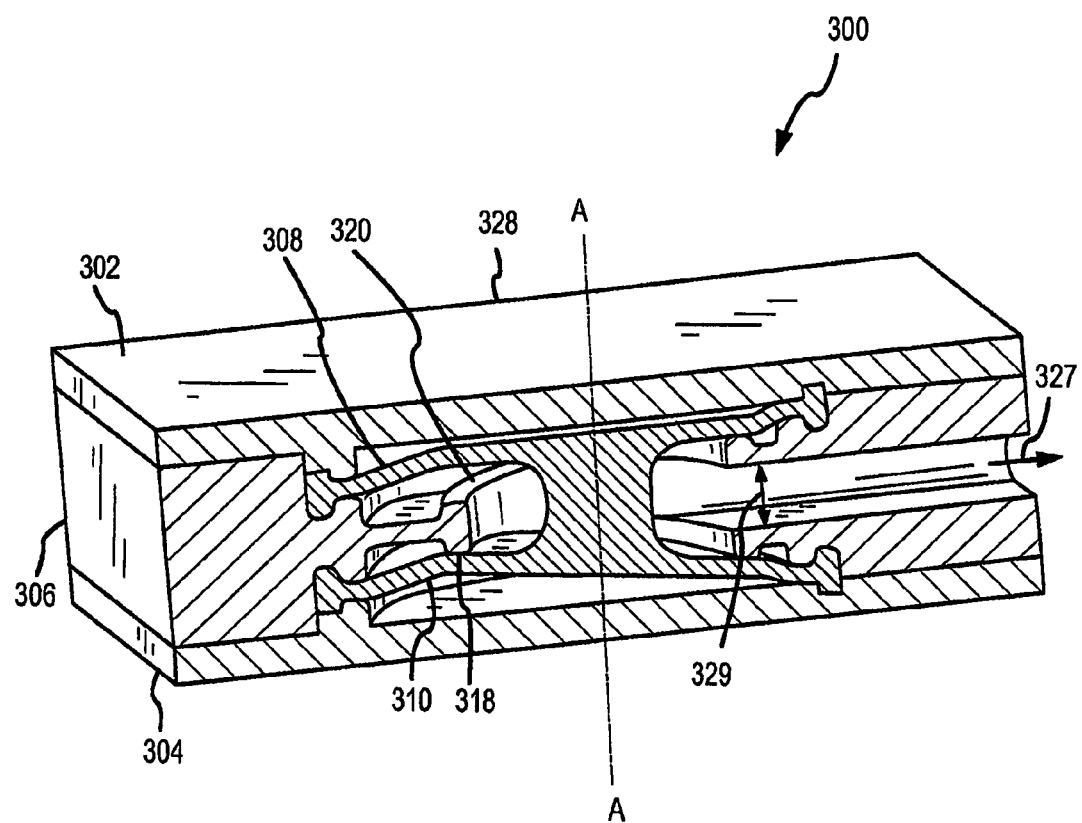
FIG. 3 is an isometric sectional view of a diaphragm valve 300 in an example embodiment of the invention.

FIGS. 3-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
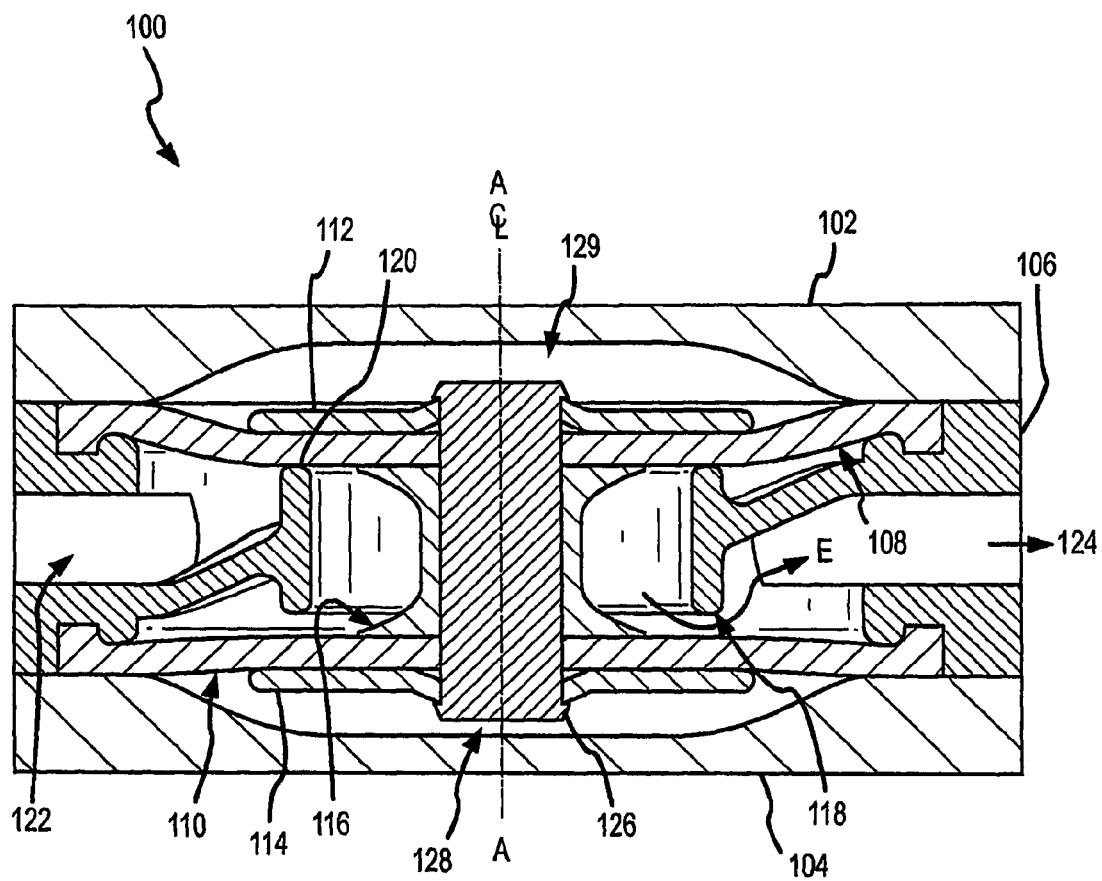
FIG. 1 is a cross sectional view of a typical prior art diaphragm valve 100.

FIG. 1 is a cross sectional view of a typical 3/2 function diaphragm valve 100. Diaphragm valve 100 comprises top plate 102, bottom plate 104, valve body 106, top diaphragm disk 108, bottom diaphragm disk 110, top retaining ring 112, bottom retaining ring 114, spacer 116, center spool 126, upper sealing surface 120, lower sealing surface 118, inlet opening 122 and exhaust 124. A diaphragm assembly is comprised of top diaphragm disk 108, bottom diaphragm disk 110, top retaining ring 112, bottom retaining ring 114, spacer 116 and center spool 126. The parts in the diaphragm assembly are generally circular in nature and are symmetric about center line AA. Top plate 102 is attached to body 106 capturing top diaphragm disk 108 in a gap between the top plate 102 and valve body 106. Bottom plate 104 is attached to valve body 106 capturing bottom diaphragm disk 110 in a gap between the bottom plate 104 and valve body 106. Upper and lower sealing surfaces are generally circular in nature with each sealing surface formed in a plane. The sealing surfaces may also be called valve seats. The two planes containing the two sealing surfaces are generally parallel to each other.

Valve 100 is shown in the off or closed position with top diaphragm disk 108 contacting upper sealing surface 120 and having a gap between bottom diaphragm disk 110 and lower sealing surface 118. The gap between the bottom diaphragm disk 110 and the lower sealing surface is uniform in height. In the closed position fluid from an outlet opening (not shown) flows through the gap between the bottom diaphragm disk 110 and lower sealing surface 118 and out through exhaust 124 (as shown by arrow E). In the on position the central part of the diaphragm assembly is shifted upward such that the bottom diaphragm disk 110 contacts lower sealing surface 118 and a gap is formed between top diaphragm disk 108 and upper sealing surface 120. The gap between the top diaphragm disk 108 and the upper sealing surface is uniform in height. In the on position, fluid flows from inlet opening 122 through the gap between top diaphragm disk 108 and upper sealing surface 120, into an outlet opening (not shown). The two diaphragm disks flex or deform as the central part of the diaphragm assembly is shifted between the open and closed positions. There is generally radial symmetry in the deformation of the two diaphragm disks. The radial symmetry forms concentric circles of constant deflection in the two diaphragm disks.

Figure 2:
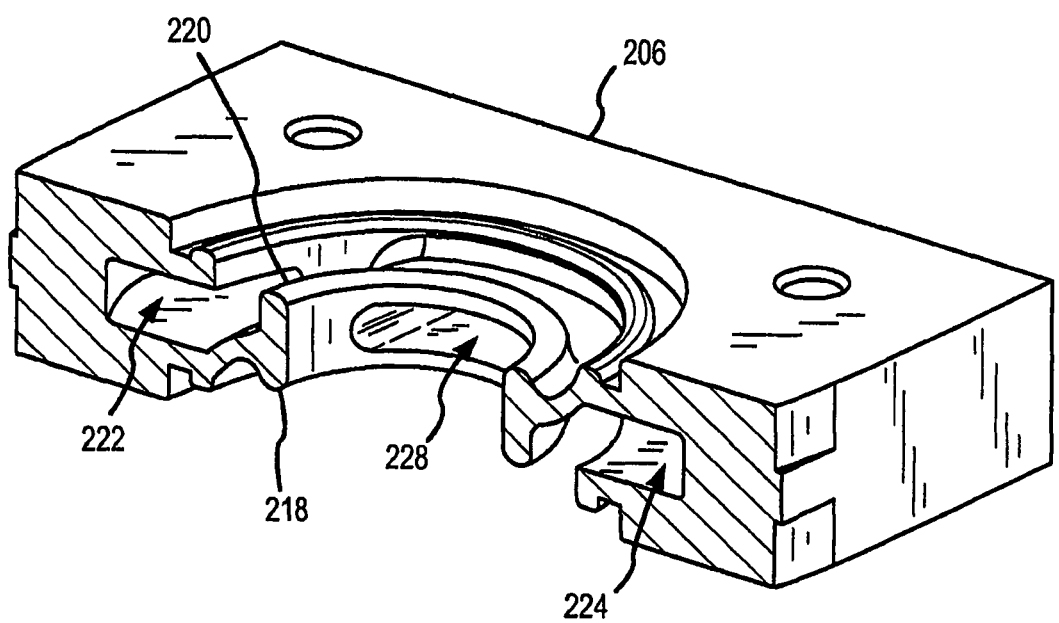
FIG. 2 is an isometric sectional view of prior art body 206.

FIG. 2 is an isometric sectional view of prior art valve body 206. Valve body 206 forms three ports or openings, port 222, port 228 and port 224, top sealing surface 220 and bottom sealing surface 218. Depending on the configuration of the valve, the ports may be used as an inlet port, an outlet port, or an exhaust port. When a diaphragm (not shown) is in the upper position, fluid enters port 222, flows over the top of top sealing surface 220 between a gap formed between the upper diaphragm membrane and the top sealing surface, and then flows into port 228. When the diaphragm (not shown) is in the lower position, fluid exits port 228, flows underneath the bottom sealing surface 218 between the gap formed between the lower diaphragm membrane and the bottom sealing surface 218, and then flows into port 224.

FIG. 3 is an isometric sectional view of a 3/2 function diaphragm valve 300 in an example embodiment of the invention. Diaphragm valve 300 comprises top plate 302, bottom plate 304, valve body 306 and diaphragm 328. Diaphragm 328 has upper diaphragm membrane 308 and lower diaphragm membrane 310. The upper diaphragm membrane 308 and lower diaphragm membrane 310 are joined together by a central diaphragm section. Diaphragm 328 is asymmetric with respect to axis AA. In one example embodiment of the invention, diaphragm 328 is fabricated in one piece. Upper diaphragm membrane 308 may be tilted with respect to the lower diaphragm membrane 310. A top sealing surface 320 and bottom sealing surface 318 are formed in valve body 306. In one example embodiment of the invention, each sealing surface is formed in a plane. The planes containing the two sealing surfaces may make an angle with respect to one-another (i.e. not parallel). The angle between the two planes can be anywhere between 1 degree and 45 degrees. In a preferred embodiment the angle is between 7 degrees and 11 degrees. The separation between the top sealing surface 320 and the bottom sealing surface 318 reach a minimum on the left side of valve body 306. The separation between the top sealing surface 320 and the bottom sealing surface 318 reach a maximum on the right side of valve body 306. Outlet opening 327 is also formed in valve body 306 between the two sealing surfaces. In one example embodiment of the invention outlet port 327 is formed at the point of maximum separation between the top sealing surface and the bottom sealing surface. By forming the outlet port at the maximum separation between the two sealing surfaces, the width 329 of outlet port 327 can be larger. This allows a larger flow rate in a given width valve than if the two sealing surfaces where parallel. Outlet opening 327 may be used as any type of port, for example the exhaust port or the supply port.

Top plate 302 is attached to valve body 306, capturing upper diaphragm membrane 308 in a gap between top plate 302 and valve body 306. Bottom plate 304 is attached to valve body 306, capturing lower diaphragm membrane 310 in a gap between bottom plate 304 and valve body 306. In one example embodiment of the invention, top plate 302 and bottom plate 304 are attached to valve body 306 by laser welding. Other attachment methods may be used to attach the top and bottom plates to valve body 304.

In operation, diaphragm 328 moves between two positions, an upper position and a lower position. The deflection of diaphragm 328 is not radially symmetric about the center of diaphragm 328. The center of motion for the deflection of diaphragm 328 may be offset to the left from axis AA causing the left side of diaphragm to move more than the right side of diaphragm 328 when diaphragm 328 is shifted between the upper and lower diaphragm positions. In the upper diaphragm position, lower diaphragm membrane 310 contacts and seals against the bottom sealing surface 318. Upper diaphragm membrane 308 is positioned away from top sealing surface 320, leaving a gap between the upper diaphragm membrane 308 and the top sealing surface 320. The gap between the upper diaphragm membrane 308 and the top sealing surface 320 may not be a constant width (i.e. the gap may be non-uniform). In one example embodiment of the invention, the gap between the upper diaphragm membrane 308 and the top sealing surface 320 is larger on the left side of diaphragm membrane 308 and smaller on the right side of diaphragm membrane 308.

In the lower diaphragm position (not shown) upper diaphragm membrane 308 contacts and seals against the top sealing surface 320. Lower diaphragm membrane 310 is positioned away from bottom sealing surface 318, leaving a gap between the lower diaphragm membrane 310 and the bottom sealing surface 318. The gap between the lower diaphragm membrane 310 and the bottom sealing surface 318 may not be a constant width (i.e. the gap may be non-uniform). In one example embodiment of the invention, the gap between the lower diaphragm membrane 310 and the bottom sealing surface 318 is larger on the left side of diaphragm membrane 310 and smaller on the right side of diaphragm membrane 310.

Diaphragm 328 is typically moved between the upper position and the lower position using an activation force created by pressure from a pilot or control fluid (not shown). The control fluid is introduced into the gap between the upper diaphragm membrane 308 and the top plate 302 to force diaphragm 328 into the lower position. The control fluid is introduced into the gap between the lower diaphragm membrane 310 and the bottom plate 304 to force diaphragm 328 into the upper position. When there is no activation force applied to either area, diaphragm 328 is configured to snap or return to a default position. The diaphragm 328 may be configured such that the default position is either the upper diaphragm position or the lower diaphragm position. In some cases, the spring force may not be strong enough to return the diaphragm to the default position if the source supply is still active. Typically, the source supply is also used for the control supply, so when there is no pressure into the valve, both the control and the source will be inactive and the diaphragm will return to the default position. In one example embodiment of the invention, diaphragm 328 is made from a resilient material, for example polyurethane, rubber, spring steel, or the like. The resilient material allows diaphragm 328 to be assembled into the valve such that the resilient diaphragm material and the shape of diaphragm 328 interacting with the valve enclosure creates a spring force that returns diaphragm 328 to a default position. The method used to move the diaphragm between the upper and lower position is not important and other methods besides a pilot fluid may be used, for example a plunger activated by a coil and attached to the diaphragm.

FIG. 4 is a drawing of diaphragm 428 in an example embodiment of the invention. In one example embodiment of the invention, diaphragm 428 is a generally circular part that is symmetric about a first axis and asymmetric about a second axis that is perpendicular to the first axis. In other example embodiments of the invention, the diaphragm 428 may be oval or rectangular in shape. Other shapes are also possible. FIG. 4a is a top view of diaphragm 428 in an example embodiment of the invention. Diaphragm 428 is symmetric with respect to axis DD and asymmetric with respect to axis EE.

FIG. 4e is a sectional view AA of diaphragm 428 in an example embodiment of the invention. Sectional view AA looks perpendicular to the axis of symmetry DD of diaphragm 428. Diaphragm 428 comprises an upper rim 444, a lower rim 442, an upper diaphragm membrane 408, a lower diaphragm membrane 410 and a center section 450. In one example embodiment of the invention, an optional alignment tab 440 is attached to diaphragm 428 and configured to help align diaphragm 428 into the proper orientation in the valve. Other alignment features may be used, for example a notch in an edge of the diaphragm membrane, a line along the top of the diaphragm membrane, or the like. In one example embodiment of the invention the upper and lower rims are generally circular in shape. In other example embodiments of the invention, the rims may be oval or rectangular in shape. The upper and lower rims (444 and 442) are configured to fit into a gap between the top plate and the body of the valve and the bottom plate and the body of the valve. The rims help hold diaphragm 428 in place in the valve and create a seal between diaphragm 428 and the valve. The upper and lower rims on the two diaphragm membranes are optional. Other methods may be used to hold the diaphragm membranes into the valve. For example, a groove or channel may be formed in the outer edge of the diaphragm membrane and a lip or bead may be formed on the top plate or on the valve body that fits into the groove. Upper diaphragm membrane 408 is coupled to upper rim 444 along the inner diameter of upper rim 444. Lower diaphragm membrane 410 is coupled to lower rim 442 along the inner diameter of lower rim 442. Upper diaphragm membrane 408 is joined to lower diaphragm membrane 410 by center section 450. In one example embodiment of the invention, diaphragm 428 is fabricated in one piece. In other example embodiments of the invention, diaphragm may comprise three or more pieces, for example an upper diaphragm membrane, a lower diaphragm membrane, and a center section used to connect the two diaphragm membranes together.

FIG. 4b is a side view of diaphragm 428 in an example embodiment of the invention. FIG. 4b shows that the plane containing upper rim 444 forms an angle α with respect to the plane containing lower rim 442. The angle between the two planes can be anywhere between 1 degree and 45 degrees. In a preferred embodiment the angle is between 7 degrees and 11 degrees. Axis GG is the centerline of the upper and lower rims (444 and 442) and axis FF is the centerline of center section 450. In one example embodiment of the invention, axis FF is offset from axis GG along axis DD.

FIG. 4f is a sectional view CC of diaphragm 428 in an example embodiment of the invention. Sectional view CC looks perpendicular to the axis of asymmetry EE of diaphragm 428. The asymmetrical condition of diaphragm is shown in FIG. 4f. The upper and lower rims (444 and 442) form an angle with respect to one another. Upper diaphragm membrane 408 is coupled to upper rim 444 along the inner diameter of upper rim 444. Lower diaphragm membrane 410 is coupled to lower rim 442 along the inner diameter of lower rim 442. Upper diaphragm membrane 408 is joined to lower diaphragm membrane 410 by center section 450. Upper diaphragm membrane 444 has a bend or kink 454 in the membrane that is aligned with the minimum gap between the two rims (444 and 442). Lower diaphragm membrane 442 has a similar bend or kink 452 in the membrane that is also aligned with the minimum gap between the two rims (444 and 442). The bends or kinks (454 and 452) help create the spring force that biases the diaphragm into the default position when installed in the valve.

FIG. 4c is a back view of diaphragm 428 in an example embodiment of the invention. FIG. 4d is a sectional view looking down on diaphragm 428 in an example embodiment of the invention.

I claim:

1. A diaphragm valve, comprising:
a diaphragm (428) configured to move along a stroke axis between a first position and a second position where the diaphragm is symmetric with respect to a first axis and asymmetric with respect to a second axis that is perpendicular to the first axis and where the first and second axes are both generally perpendicular to the stroke axis;
wherein the diaphragm (428) comprises:
an upper diaphragm membrane (408) formed in essentially a first plane; and
a lower diaphragm membrane (410) formed in essentially a second plane where the first plane makes an angle greater than 0° with respect to the second plane.

2. The diaphragm valve of claim 1 where the diaphragm further comprises:
a center section (450) coupling the upper diaphragm membrane (408) to the lower diaphragm membrane (410) where the center section (450) is offset from a centerline of the diaphragm (GG) and the axis of symmetry is formed by a line drawn between the centerline of the diaphragm and a centerline of the center section.

3. The diaphragm valve of claim 2 where the diaphragm is fabricated in one piece.

4. The diaphragm valve of claim 1 where the diaphragm is made from a resilient material and the upper diaphragm membrane (408) has a bend (454) configured to generate a force that returns the diaphragm to a default position in the absence of an activation force.

5. The diaphragm valve of claim 1 further comprising:
a body (306) forming a top sealing surface (320) and a bottom sealing surface (318);
the upper diaphragm membrane (308) configured to seal against the top sealing surface (320) when the diaphragm is in the first position; and
the lower diaphragm membrane (310) configured to seal against the bottom sealing surface (318) when the diaphragm is in the second position.

6. The diaphragm valve of claim 5 further comprising:
a top plate (302) configured to be attached to a top side of the body (306) thereby capturing the upper diaphragm membrane (308) between the body (306) and the top plate (302); and
a bottom plate (304) configured to be attached to a bottom side of the body (306) thereby capturing the lower diaphragm membrane (310) between the body (306) and the bottom plate (304).

7. The diaphragm valve of claim 6 further comprising:
a top rim (444) attached to and surrounding the upper diaphragm membrane (408) and forming a seal between the body (306) and the top plate (302); and
a bottom rim (442) attached to and surrounding the lower diaphragm membrane (410) and forming a seal between the body (306) and the bottom plate (304).

8. The diaphragm valve of claim 1 where the diaphragm is essentially circular in shape.

9. The diaphragm valve of claim 1 where the diaphragm is essentially oval in shape.

10. The diaphragm valve of claim 1 where the diaphragm is essentially rectangular in shape.

11. The diaphragm valve of claim 1 where the diaphragm is fabricated in one piece.

12. The diaphragm valve of claim 1 where the stroke axis is offset from a centerline of the diaphragm.

13. The diaphragm valve of claim 1 where the diaphragm is made from a resilient material and is biased towards a default position in the absence of an activation force.

14. The diaphragm valve of claim 1 further comprising:
an alignment feature (440) aligned with the first axis.

15. A method, comprising:
moving a diaphragm between a first position and a second position along a stroke axis where the stroke axis is offset from a centerline of the diaphragm, wherein the diaphragm comprises an upper diaphragm membrane formed in essentially a first plane and a lower diaphragm membrane formed in essentially a second plane where the first plane makes an angle greater than 0° with respect to the second plane;

forming a first gap between the upper diaphragm membrane and a top sealing surface of the diaphragm valve when the diaphragm is in the first position; and forming a second gap between the lower diaphragm membrane and a bottom sealing surface of the diaphragm valve when the diaphragm is in the second position, where the first and second gaps are non-uniform.

16. The method of claim 15 where a maximum width of the first gap is on a line formed between the centerline of the diaphragm and the stroke axis.

17. The method of claim 15 further comprising:
biasing the diaphragm towards the first position.

18. The method of claim 17 where the diaphragm is made from a resilient material and is biased towards the first position by interacting with a valve enclosure.

19. The method of claim 15 where the diaphragm is fabricated in one piece.

* * * * *